United States Patent
Marsili et al.

(10) Patent No.: US 7,643,802 B2
(45) Date of Patent: Jan. 5, 2010

(54) MIXER CIRCUIT AND METHOD FOR REDUCING AN UP-CONVERSION MIXER LEAKAGE

(75) Inventors: Stefano Marsili, Fürnitz (AT); Andreas Wiesbauer, Pörtschach (AT); Marc Tiebout, Wessling (DE)

(73) Assignee: Infineon Technologies AG, Munich (DE)

( * ) Notice: Subject to any disclaimer, the term of this patent is extended or adjusted under 35 U.S.C. 154(b) by 485 days.

(21) Appl. No.: 11/492,466

(22) Filed: Jul. 25, 2006

(65) Prior Publication Data
US 2008/0026708 A1  Jan. 31, 2008

(51) Int. Cl.
*H04B 1/04* (2006.01)
(52) U.S. Cl. ............... 455/114.2; 455/118; 455/126
(58) Field of Classification Search ............ 455/114.1, 455/114.2, 115.1, 115.2, 118, 126, 226.1, 455/293, 296, 311, 312, 317
See application file for complete search history.

(56) References Cited

U.S. PATENT DOCUMENTS

| | | | |
|---|---|---|---|
| 6,868,279 B2 * | 3/2005 | Sahlman et al. | 455/522 |
| 7,280,805 B2 * | 10/2007 | Xu et al. | 455/67.11 |
| 2003/0138034 A1 | 7/2003 | Shi et al. | |
| 2006/0063497 A1 * | 3/2006 | Nielsen | 455/118 |
| 2007/0123182 A1 * | 5/2007 | Dekker | 455/114.1 |
| 2008/0013755 A1 * | 1/2008 | Marsili et al. | 381/119 |

FOREIGN PATENT DOCUMENTS

| | | |
|---|---|---|
| WO | WO 01/71904 A1 | 9/2001 |
| WO | WO 02/19564 A2 | 3/2002 |

OTHER PUBLICATIONS

"A WiMedia/MBOA-Compliant CMOS RF Transceiver for UWB", Christoph Sandner, Sven Derksen, Dieter Draxelmary, Staffan Ek, Voicu Filimon, Graham Leach, Stefano Marsili, Denis Malveev, Kown Mertens, Florian Michl, Hermann Paule, Manfred Punzenberger, Christian Reindl, Raffaele Salerno, Marc Biebout, Andreas Wiesvauer, Ian Winter and Zisan Zhang, ISSCC 2006/Session 6/UWEB Transceivers/6.5, IEEE international Solid-State Circuits Conference, 2006, pp. 122-123.

"A WLAN Direct Up-Conversion Mixer with Automatic Image Rejection Calibration", Jan Craninckx, Björn Debaillie, Boris Côme and Stéphane Donnay, ISSCC 2005/Session 29/ RF Techniques/29:9, IEEE International Solid-Stage Circutis Conference, 2005, pp. 546-547.

* cited by examiner

*Primary Examiner*—Nguyen Vo
(74) *Attorney, Agent, or Firm*—Eschweiler & Associates, LLC

(57) ABSTRACT

A mixer circuit includes a first oscillator, a second oscillator, an up-conversion mixer, a down-conversion mixer, and a detect and control unit. The up-conversion mixer has a first input terminal coupled to the first oscillator and an output terminal. The down-conversion mixer has a first input terminal coupled to the output terminal of the up-conversion mixer and a second input terminal coupled to the second oscillator. The detect and control unit is coupled to the down-conversion mixer.

19 Claims, 3 Drawing Sheets

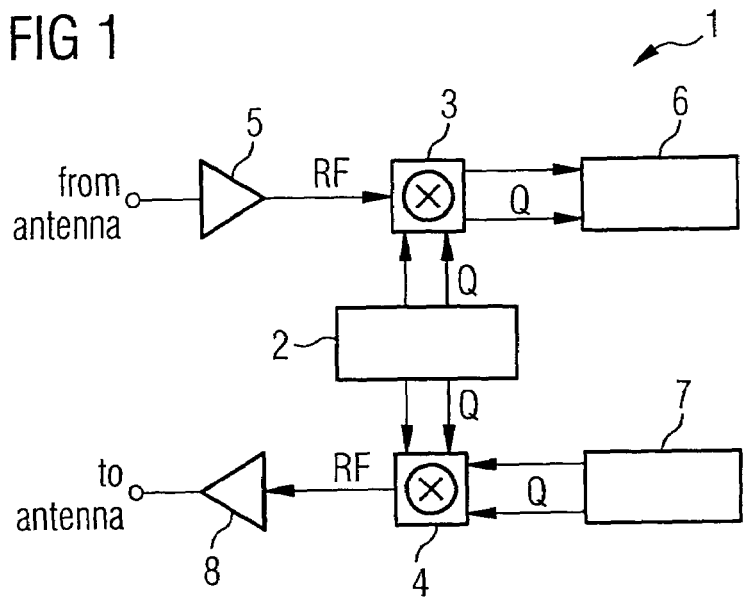
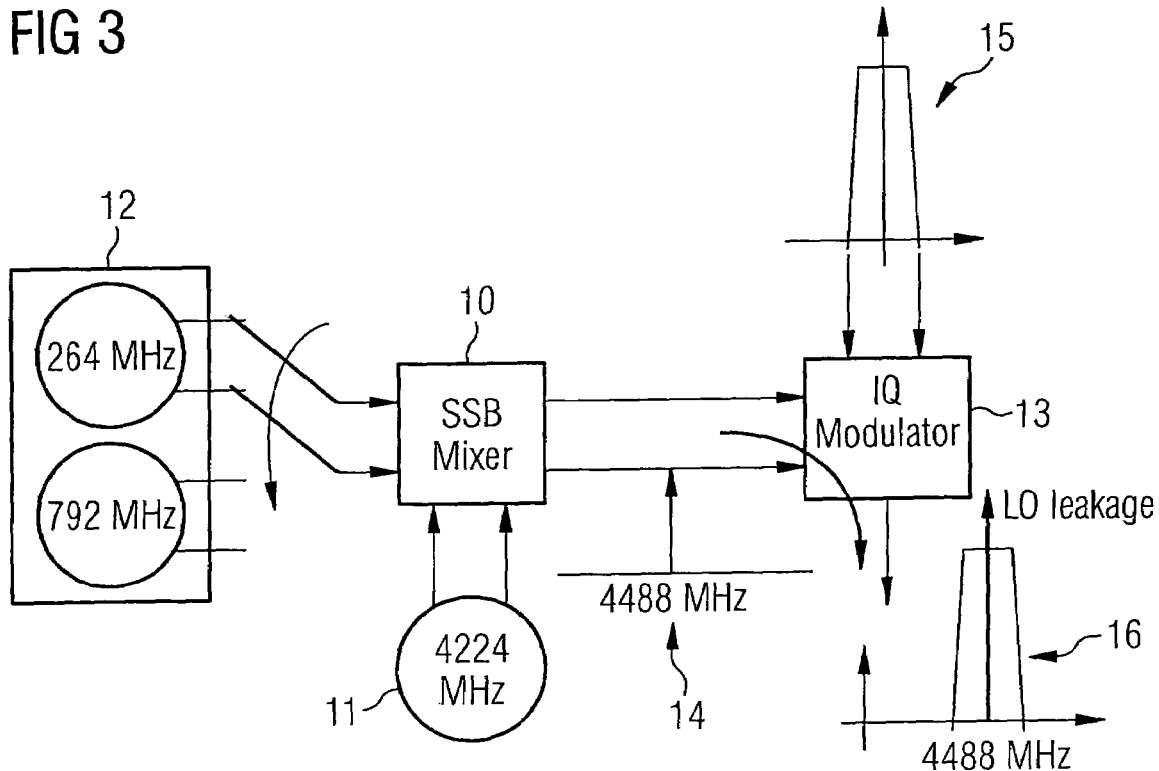

MIXER CIRCUIT AND METHOD FOR REDUCING AN UP-CONVERSION MIXER LEAKAGE

FIELD OF THE INVENTION

This invention relates to a mixer circuit, a method for reducing or eliminating the effects of an up-conversion mixer leakage. The mixer circuit may be utilized in a radio transmitter.

BACKGROUND OF THE INVENTION

Radio transmitters usually use up-conversion mixers to produce radio transmit signals. Up-conversion mixers may exhibit a leakage from one of their input terminals to their output terminal. The spurious signals caused by the leakage need to be eliminated or at least reduced so that they do not significantly degrade the spectral purity of the transmitter output.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates radio communication by mitigating the effects of up-conversion mixer leakage. Circuits and methods are disclosed that mitigate the effects of this leakage.

In accordance with an aspect of the invention, a mixer circuit is disclosed. A mixer circuit includes a first oscillator, a second oscillator, an up-conversion mixer, a down-conversion mixer, and a detect and control unit. The up-conversion mixer has a first input terminal coupled to the first oscillator and an output terminal. The down-conversion mixer has a first input terminal coupled to the output terminal of the up-conversion mixer and a second input terminal coupled to the second oscillator. The detect and control unit is coupled to the down-conversion mixer.

In accordance with another aspect of the invention, a method of operating a radio transmitter is disclosed. A first signal is produced. A second signal is produced. an up-conversion mixer is provided which exhibits a leakage from a first terminal to an output terminal. The first signal is supplied to the first terminal of the up-conversion mixer. An output signal is generated at the output terminal of the up-conversion mixer. The output signal is down-converted by mixing the output signal with the second signal to produce a down-converted signal. A spurious signal is detected in the down-converted signal. A leakage correction signal is produced from or according to the spurious signal. Other circuits, systems, methods, and arrangements are disclosed.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 schematically illustrates a radio transceiver using a frequency synthesizer for generating a radio frequency.

FIG. 3 schematically illustrates the effects of up-conversion mixer leakage within the frequency synthesizer.

DETAILED DESCRIPTION OF THE INVENTION

Figure 2:
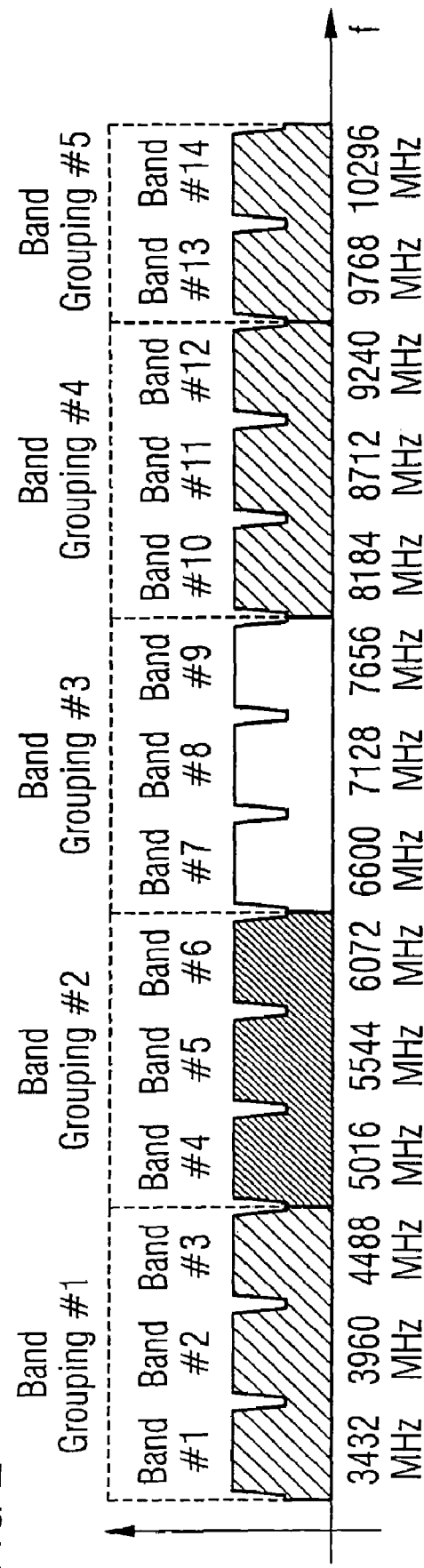
FIG. 2 illustrates the frequency allocation specified by the multi-band orthogonal frequency division multiplexing ultra-wideband (MB-OFDM UWB) standard.

One or more aspects and/or embodiments of the invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Referring to FIG. 1, there is shown an example of a radio transceiver 1 using a frequency synthesizer 2 for generating a radio frequency signal. The radio frequency signal is used for up-converting baseband signals which are to be transmitted and for down-converting received radio frequency signals. The radio transceiver 1 shown in FIG. 1 is based on a direct conversion concept meaning that baseband signals are up-converted to a transmission frequency in a single operation and incoming radio frequency signals are down-converted to baseband without going to an intermediate frequency.

The frequency synthesizer 2 provides radio frequency signals in the form of complex signals having I (in-phase) and Q (quadrature) components. The I and Q components are applied to input terminals of mixers 3 and 4. Mixer 3 is arranged in a receiver path of the radio transceiver 1, and mixer 4 is arranged in a transmitter path.

The mixer 3 has a further input terminal which is coupled to the output terminal of an amplifier 5, which may be a low-noise amplifier. The amplifier 5 receives incoming signals from an antenna and after amplification the amplifier 5 feeds the mixer 3 with the received signals. The output terminals of the mixer 3 are connected to the input terminals of a baseband processing unit 6 which accomplishes further processing of the down-converted signals. In the transmitter path, the mixer 4 receives baseband signals from a baseband processing unit 7 and up-converts these signals to the transmission frequency before they pass through a power amplifier 8 and are transmitted via the antenna.

In the example, the purpose of the frequency synthesizer 2 is the generation of the proper radio frequencies required by the multi-band OFDM ultra-wideband (MB-OFDM UWB) specification. The frequency allocation specified by the MB-OFDM UWB standard is shown in FIG. 2. According to this standard, a transmitter or receiver can operate inside one of the band groups 1 to 5. The signal level allowed by FCC (Federal Communications Commission) for the U.S.A. is −43.5 dBm/MHz. In Europe the possibility for band group 1 to use a mask with a limit of −70 dBm/MHz up to 4.2 GHz is under discussion.

Frequency synthesizers as shown in FIG. 1 typically comprise mixer circuits which multiply a higher reference frequency signal with a variable lower frequency signal. Such a mixer circuit is shown as an example in FIG. 3. A mixer 10, which may be a single-side band (SSB) mixer for example, obtains a reference frequency signal, for instance 4224 MHz, which may be generated by a reference oscillator 11, for example a phase-locked loop, and shifts the reference frequency by an offset of, for example, −264 MHz or +264 MHz or −792 MHz. In this manner, three frequencies needed to cover band group 1 of the MB-OFDM UWB standard can be obtained by adding or subtracting a variable lower frequency from a fixed reference frequency. The lower frequencies may be generated using a direct digital synthesizer 12 or a divider, for example. The switching of the lower frequency can be obtained relativley quickly, for example, by switching an input look-up table of a digital-to-analog converter, as to allow fast frequency hopping required in the UWB system. The quadrature output signals of the SSB mixer 10 are used to directly up-convert baseband signals by means of an IQ modulator 13.

Up-conversion mixer circuits such as the IQ modulator 13 shown in FIG. 3 may exhibit mixer leakage. Such a mixer leakage occurs, for example, when a portion of the reference frequency signal of 4488 MHz, which is applied to the IQ modulator 13, appears at the output terminal of the IQ modulator 13 without being mixed with the baseband signal. The output signal of the SSB mixer 10 is shown in diagram 14 showing one signal component at 4488 MHz. Diagram 15 shows the baseband input spectrum of the IQ modulator 13. The effect of the mixer leakage of the IQ modulator 13 is an unwanted LO leakage signal at 4488 MHz which is not modulated with the baseband signal. This LO leakage signal is shown in diagram 16.

The leakage spectrum shown in diagram 16 may fall outside the emission mask. In order to fulfill the requirements, the mixer leakage must be well below −30 dBc below the desired signal. Furthermore, the leakage spectrum can not be removed by an external filter since it is located in the middle of the allowed spectrum.

Figure 4:
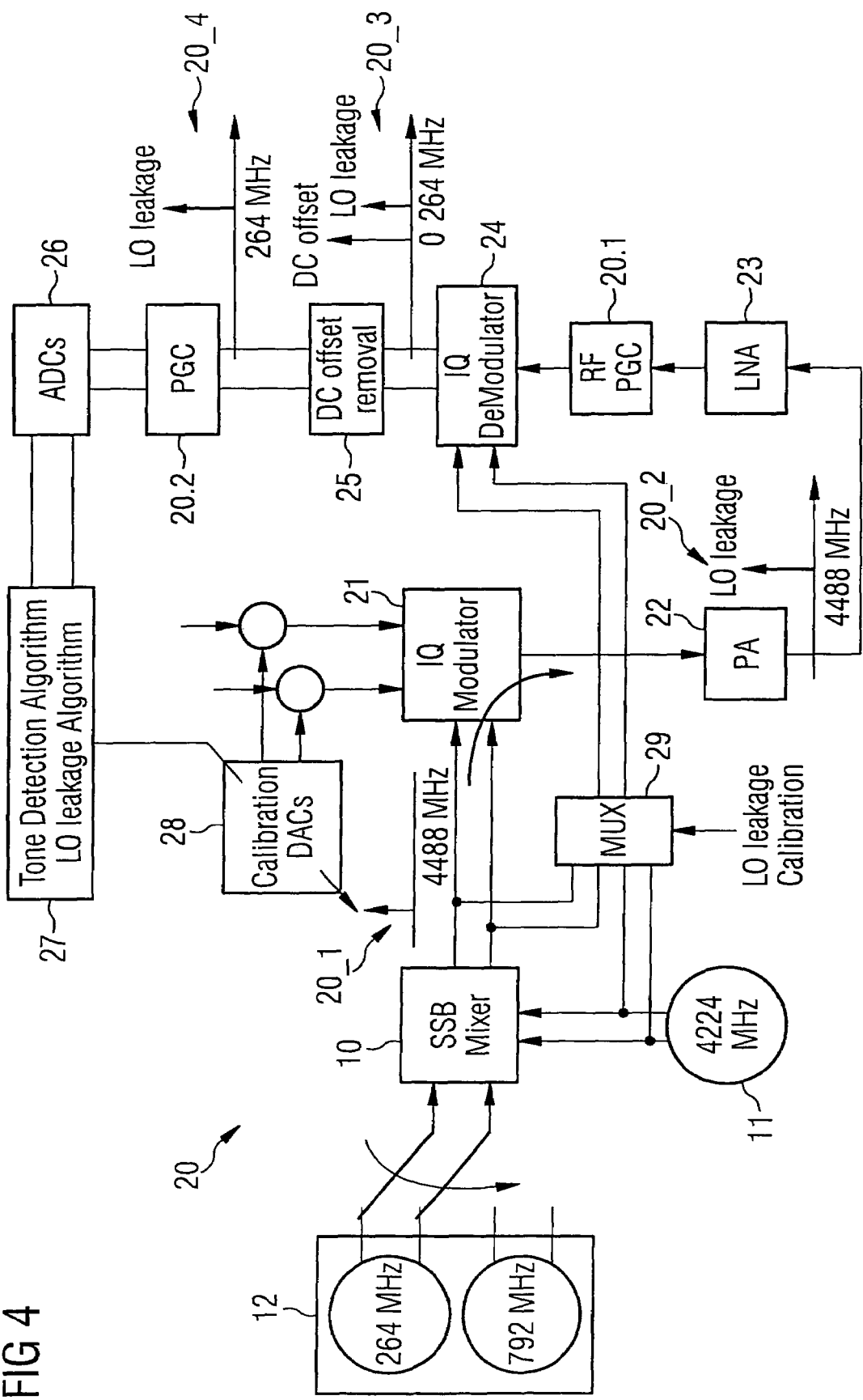
FIG. 4 schematically illustrates a radio transceiver at an exemplary embodiment of the invention.

Referring to FIG. 4, a block diagram of a radio transceiver 20 is shown comprising an apparatus for reducing or eliminating effects of IQ modulator leakage. The circuit shown in FIG. 4 is an embodiment of the invention. It is appreciated that variations of the transceiver 20 are contemplated and in accordance with the invention.

The transceiver 20 comprises a transmitter path with an IQ modulator 21 and a power amplifier 22 as well as a receiver path with an amplifier 23, which may be a low-noise amplifier, and an IQ demodulator 24. Furthermore, a mixing circuit as shown in FIG. 3 is employed to create a local oscillator signal. The local oscillator signal is applied to the local oscillator terminals of the IQ modulator 21 and to first input terminals of a multiplexer 29. The output signal of a reference oscillator 11 is delivered to the SSB mixer 10 and to second input terminals of the multiplexer 29. The output terminals of the multiplexer 29 are coupled to input terminals of the IQ demodulator 24. Upon an input signal "LO leakage calibration" supplied to the multiplexer 29, the multiplexer 29 connects its second input terminals with its output terminals so that the output signal of the reference oscillator 11 is delivered to the IQ demodulator 24.

The IQ modulator 21 comprises the function of an up-conversion mixer as it uses the local oscillator signal of the SSB mixer 10 to up-convert signals to a higher frequency and the IQ demodulator 24 comprises the function of a down-conversion mixer as it down-converts signals from a higher frequency to a lower frequency, in particular to baseband. In the embodiment shown in FIG. 4 in case of an LO leakage calibration mode a first signal of a first frequency of 4488 MHz is delivered to the IQ modulator 21 and a second signal of a second frequency of 4224 MHz is delivered to the IQ demodulator 24. When the LO leakage calibration mode is not activated by the "LO leakage calibration" signal the multiplexer 29 connects its first terminals with its output terminals so that the same frequency is provided to the IQ modulator 21 and to the IQ demodulator 24.

The IQ modulator 21 shown in FIG. 4 suffers from mixer leakage. Such mixer leakage occurs due to the fact that the reference signal as supplied from the SSB mixer 10 at the input terminal of the IQ modulator 21 leaks to the output of the IQ modulator 21 without being mixed with the baseband signal which is normally supplied to the other terminals of the IQ modulator 21. Therefore, in a normal transmission operation mode beside the wanted up-converted baseband signal a spurious signal appears at the output terminal of the IQ modulator 21, which in the present embodiment is at a frequency of 4488 MHz. The leakage signal at 4488 MHz can be reduced or eliminated by adding a complex constant to the input signal of the IQ modulator 21. For this purpose a leakage correction signal register 28 is provided, which is implemented in the form of one or more digital-to-analog converters. The output terminals of the digital-to-analog converter 28 are connected to the baseband input terminals of the IQ modulator 21 so that a complex constant is added to the input signal. When the proper complex constant is up-converted by the IQ modulator 21, the sinusoidal signal could compensate the leakage signal occurring at the output terminal of the IQ modulator 21. This is the case if the sinusoidal signal resulting from the complex constant has opposite phase and same amplitude of the leakage signal.

The appropriate constant to be generated by the digital-to-analog converter 28 is chosen by means of a DC removal circuit 25, a PGC circuit 20.2, an analog-to-digital converter circuit 26 and a detection and control unit 27. The DC removal circuit 25, the PGC circuit 20.2, the analog-to-digital converter circuit 26 and the detector and control unit 27 are arranged in series and downstream of the IQ demodulator 24. The detection and control unit 27 are coupled to an output terminal of the analog-to-digital converter circuit 26 and an input terminal of the digital-to-analog converter 28. Furthermore, the output terminal of the power amplifier 22 is connected to the input terminal of the low-noise amplifier 23. Alternatively, for instance, the output terminal of the IQ modulator 21 may be connected to the input terminal of the IQ demodulator 24.

The function of the mixer circuit for reducing or eliminating the effects of IQ modulator mixer leakage is described in the following. In order to detect a signal whose amplitude is related to the amplitude of the IQ modulator LO leakage, no signal is provided at the baseband input of the IQ modulator 21 in this specific example. The reference oscillator 11 provides a signal of a frequency of 4224 MHz to the input of the SSB mixer 10 and to the second inputs of the multiplexer 29. The SSB mixer 10 provides a signal with a frequency of 4488 MHz (see diagram 20_1 in FIG. 4) to the input of the IQ modulator 21. A signal "LO leakage calibration" is delivered to the multiplexer 29 thereby effecting the multiplexer 29 to connect its second input terminals to its output terminals so that a signal with a frequency of 4224 MHz of the reference oscillator 11 is delivered to the IQ demodulator 24. At the output of the IQ modulator 21 the signal contains a tone due to the leakage at 4488 MHz due to the present embodiment (see diagram 20_2 in FIG. 4).

The signals occurring at the output terminal of the IQ modulator 21 are looped-back to the receiver path of the radio transceiver 20 via the connection between the power amplifier 22 and the low-noise amplifier 23. Different looped-back paths could also be used, for example as mentioned above, as a direct connection between the IQ modulator 21 and the IQ demodulator 24.

In the receiver path, the local oscillator terminal of the IQ demodulator 24 is driven by a different frequency compared to the IQ modulator 21 at the transmitter side. The local oscillator input of the IQ demodulator 24 can therefore be connected through the multiplexer 29 either to the same local oscillator signal used at the transmitter (for normal operation) or to an auxiliary frequency used for the leakage calibration, as in the present embodiment the output signal of the reference oscillator 11 having a frequency of 4224 MHz. This second frequency is already available in the local oscillator generation scheme. Therefore, the implementation of additional hardware reduces to the multiplexer 29 and the digital-to-analog converter 28.

In the receiver path the signal is then delivered from the low-noise amplifier 23 to an RF-PGC circuit 20.1 from which the signal is delivered to the IQ demodulator 24. In the IQ demodulator 24 the spurious signal due to the leakage at the IQ modulator 21 at the transmitter is down-converted to a certain frequency different from DC (in the present embodiment +264 MHz). The IQ demodulator 24 is usually affected by a DC offset due to self mixing and local oscillator leakage. Therefore, a second tone is present at DC after the IQ demodulator 24 (see diagram 20_3 in FIG. 4). In a direct conversion receiver conventionally after the mixer a DC offset removal hardware is implemented and the DC offset can be removed therewith. Accordingly, due to the present embodiment the DC offset is removed in the DC offset removal circuit 25 (see diagram 20_4 in FIG. 4).

After the analog-to-digital conversion in the analog-to-digital converter circuit 26 a digital detection algorithm is required to evaluate the strength of the LO leakage tone. This detection is done in the detection and control unit 27. The algorithm controls the LO leakage calibration digital-to-analog converter 28 until the minimum strength is reached.

The radio transceiver 20 shown in FIG. 4 can reduce the leakage of the IQ modulator 21, thus fulfilling the European mask requirement.

Although in FIG. 4 the receiver path of the radio transceiver 20 is utilized to down-convert the output signals of the IQ modulator 21, it is also possible to employ an additional IQ demodulator for the same task.

During normal use of the radio transceiver 20, the loop-back connection between the transmitter and receiver path is disconnected and no external "LO leakage calibration" signal is applied to the multiplexer 29. With this, the radio transceiver 20 is used in the manner described above with regard to the radio transceiver 1 shown in FIG. 1.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. The term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A mixer circuit comprising:
    a first oscillator to provide a first signal having a first frequency;
    a second oscillator to provide a second signal having a second frequency;
    an up-conversion mixer having a first input terminal coupled to the first oscillator an output terminal to provide an output signal, the up-conversion mixer exhibiting a leakage from its first terminal to the output terminal;
    a down-conversion mixer having a first input terminal coupled to the output terminal of the up-conversion mixer, a second input terminal coupled to the second oscillator, and provides a down-conversion signal at an output terminal by downconverting the output signal of the up-conversion mixer;
    a detection and control unit coupled to the down-conversion mixer to detect a spurious signal in the down-converted signal, the spurious signal indicating the leakage of the up-conversion mixer, and to generate a leakage correction signal according to the spurious signal; and
    a multiplexer having a first input terminal coupled to the first oscillator and a second input terminal coupled to the second oscillator and an output terminal coupled to the down-conversion mixer.

2. The mixer circuit of claim 1, further comprising a DC removal circuit arranged between the down-conversion mixer and the detection and control unit to remove a DC signal from the down-converted signal.

3. The mixer circuit of claim 1, wherein the multiplexer further comprises a third input terminal for receiving a local oscillator leakage calibration signal and the multiplexer connects the second input terminal to the output terminal on receipt of the local oscillator leakage calibration signal.

4. The mixer circuit of claim 1, further comprising a leakage correction signal register coupled to the detection and control unit to register the leakage correction signal of the detection and control unit.

5. The mixer circuit of claim 4, wherein the up-conversion mixer further comprises a second input terminal for receiving a baseband signal and the second input terminal is coupled to the leakage correction signal register.

6. A mixer circuit comprising:
    a first oscillator that generates a first signal;
    a second oscillator that generates a second signal according to a leakage calibration signal;

an up-conversion mixer having a first input terminal coupled to the first oscillator and an output terminal;

a down-conversion mixer having a first input terminal coupled to the output terminal of the up-conversion mixer and a second input terminal coupled to the second oscillator; and a detection and control unit coupled to the down-conversion mixer that generates the leakage calibration signal.

7. The mixer circuit of claim 6, further comprising a DC removal circuit arranged between the down-conversion mixer and the detection and control unit.

8. The mixer circuit of claim 6, further comprising a multiplexer having a first input terminal coupled to the first oscillator and a second input terminal coupled to the second oscillator and an output terminal coupled to the down-conversion mixer.

9. The mixer circuit of claim 8, wherein the multiplexer comprises a third input terminal for receiving a local oscillator leakage calibration signal.

10. The mixer of claim 6, further comprising a leakage correction signal register coupled to the detection and control unit for storing the leakage correction signal.

11. The mixer circuit of claim 6, wherein the up-conversion mixer has a second input terminal for supplying a baseband signal thereto and wherein the second input terminal of the up-conversion mixer is coupled to the leakage correction signal register.

12. A radio transmitter comprising:
a first oscillator;
a second oscillator;
an up-conversion mixer having a first input terminal coupled to the first oscillator and an output terminal;
a down-conversion mixer having a first input terminal coupled to the output terminal of the up-conversion mixer and a second input terminal coupled to the second oscillator;
a detection and control unit coupled to the down-conversion mixer; and
a multiplexer having a first input terminal coupled to the first oscillator and a second input terminal coupled to the second oscillator and an output terminal coupled to the down-conversion mixer.

13. The radio transmitter of claim 12, further comprising a DC removal circuit arranged between the down-conversion mixer and the detection and control unit.

14. The radio transmitter of claim 12, further comprising a leakage correction signal register coupled to the detection and control unit.

15. The radio transmitter of claim 14, wherein the up-conversion mixer has a second input terminal for receiving a baseband signal and wherein the second input terminal of the up-conversion mixer is coupled to the leakage correction signal register.

16. A method for mitigating the effects of an up-conversion mixer leakage, the method comprising:
providing a first signal of a first frequency;
providing a second signal of a second frequency;
supplying the first signal to a first terminal of an up-conversion mixer, which exhibits a leakage from the first terminal to an output terminal and generating an output signal at the output terminal of the up-conversion mixer;
down-converting the output signal by mixing the output sign al with the second signal to produce a down-converted signal;
detecting a spurious signal in the down converted signal due to a leakage signal occurring at the output terminal of the up-conversion mixer and producing a leakage correction signal from the spurious signal; and
starting the method by generating a local oscillator leakage calibration signal, wherein the calibration signal triggers the provision of the second signal employed in down-converting the output signal.

17. The method of claim 16, further comprising removing a DC signal from the down-converted signal.

18. The method of claim 16, further comprising removing a DC signal from the down-converted signal prior to detecting the spurious signal.

19. A method of operating a radio transmitter, the method comprising:
producing a first signal of a first frequency;
producing a second signal of a second frequency;
providing an up-conversion mixer which exhibits a leakage from a first terminal to an output terminal;
supplying the first signal to the first terminal of the up-conversion mixer;
generating an output signal at the output terminal of the up-conversion mixer;
down-converting the output signal by mixing the output signal with the second signal to produce a down-converted signal;
detecting a spurious signal in the down-converted signal;
producing a leakage correction signal from the spurious signal; and
generating a local oscillator leakage calibration signal according to the leakage correction signal, and wherein producing the second signal occurs only in the presence of the local oscillator leakage calibration signal.

* * * * *